W. H. KNAPP.
RAISIN SEEDING MACHINE.
APPLICATION FILED NOV. 15, 1907.
940,327.
Patented Nov. 16, 1909.
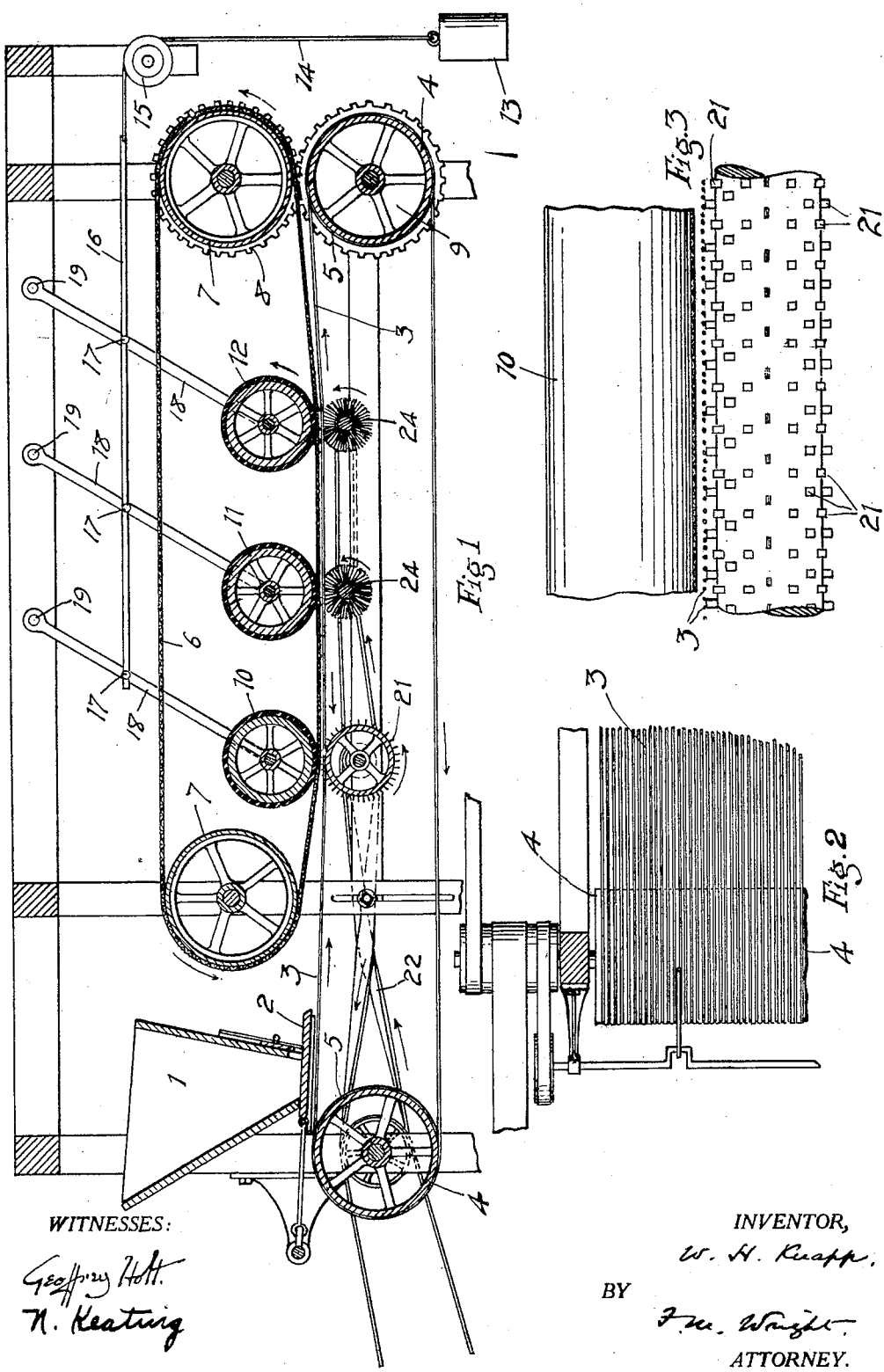
WITNESSES:
Geoffrey Holt
N. Keating
INVENTOR,
W. H. Knapp.
BY
F. M. Wright
ATTORNEY.

UNITED STATES PATENT OFFICE

WILLIAM H. KNAPP, OF FRESNO, CALIFORNIA, ASSIGNOR OF ONE-HALF TO WILLIAM HENRY McKENZIE, OF FRESNO, CALIFORNIA.

RAISIN-SEEDING MACHINE.

940,327.  Specification of Letters Patent.  Patented Nov. 16, 1909.

Application filed November 15, 1907. Serial No. 402,236.

*To all whom it may concern:*

Be it known that I, WILLIAM H. KNAPP, a citizen of the United States, residing at Fresno, in the county of Fresno and State of California, have invented new and useful Improvements in Raisin-Seeding Machines, of which the following is a specification.

This invention relates to improvements in raisin seeding machines, the object of the invention being to provide a machine of this character which will be simple in construction, effective in operation, and of large capacity for the size of the machine.

In the accompanying drawing Figure 1 is a longitudinal sectional view of the machine; Fig. 2 is a broken horizontal section thereof; Fig. 3 is a broken transverse sectional view thereof.

Referring to the drawing, 1 indicates a suitable hopper into which the raisins are supplied, and from which they are fed by means of a shaking table 2, at the bottom, said table delivering the raisins in a thin layer on to the conveyer 3. Said conveyer is formed of endless wire bands, which travel around grooved drums 4, one at each end of the machine. The grooves 5 in said drums are just sufficient in size to receive the wires, and are formed at a distance from each other of from one-eighth to one-twelfth of an inch. The bands therefore travel at a corresponding distance from each other, and as they are arranged to be all of the same tension, they thus form a conveyer upon the upper surface of which the raisins travel after being delivered from the hopper by the checking table. Above said conveyer is a canvas belt 6 of the same width as the conveyer, traveling around drums 7 of the same diameter as the drums 4, and rotated therewith by means of gear wheels 8, 9. The function of the canvas belt is to maintain the raisins in the same place upon the wire belt throughout the process of seeding, and also to prevent the raisins coming in direct contact with the upper rollers 10, 11, 12. These rollers are provided in order to hold the canvas belt down to the traveling wire belt, and the pressure of these rollers upon the canvas belt is varied by means of a weight 13 attached to a rope 14 passing around a pulley 15 and attached to a link 16, pivoted at 17 to levers 18 fulcrumed at 19, the free ends of said levers being attached to the shaft of said rollers 10, 11, 12. By reason of the pressure of the rollers 10, 11, 12, the raisins are pressed down upon the wire bands, thereby causing the seeds of the raisins to protrude downward between the wires. The raisin is held firmly in place above the wire bands, while the seed protrudes downward and is retained within the raisin only by its thin tough skin, which is easily punctured or cut to release the seed. At this time the under sides of the raisins are engaged by a cutter wheel 20 provided with transverse knives 21 and rapidly rotated, in the opposite direction to the drums, by means of a belt 22. Said knives slit the skins of the raisins and permit the seeds to be protruded therefrom. The raisins then pass onward with the wire bands, their seeds protruding through or between said wires, and said seeds are then engaged with a succession (two being here shown) of rotary brushes 24, which brush off the raisin seeds. The raisins now free from their seeds pass to the end of the machine between the wire bands and the canvas belt, and are removed therefrom in any suitable manner.

I claim:—

1. A raisin seeding machine comprising endless wire bands, drums around which said bands extend in close proximity to each other to form a conveyer between said drums, means for rotating said drums, means for feeding raisins on to said conveyer, means for forcibly pressing the raisins against said conveyer to protrude the seeds of the raisins between the wires thereof, means for cutting the skins of the raisins over the protruded seeds and means for removing the seeds from the raisins, substantially as described.

2. A raisin seeding machine comprising endless wire bands, drums around which said bands travel in close proximity to each other to form a conveyer between said drums, a belt above and in close proximity to said conveyer, means for feeding the raisins between said conveyer and belt, means for forcibly pressing the belt against the conveyer to protrude the seeds of the raisins through the wires of the belt, means for cutting the skins of the raisins, and means for removing the seeds from said raisins, substantially as described.

3. A raisin seeding machine comprising endless wire bands, drums around which said bands travel in close proximity to each other to form a conveyer between said drums, a belt above and in close proximity to said conveyer, means for feeding the raisins between said conveyer and belt, means for forcibly pressing the belt against the conveyer to protrude the seeds of the raisins through the wires of the belt, comprising rollers above said belt, obliquely extending levers attached to said rollers, a link attached to said levers, and a weight attached to said link, means for cutting the skins of the raisins, and means for removing the seeds from said raisins, substantially as described.

4. A raisin seeding machine comprising endless wire bands, drums around which said wire bands extend in close proximity to each other to form a conveyer between said drums, means for rotating said drums, means for feeding raisins on to said conveyer, means for forcibly pressing the raisins against said conveyer to protrude the seeds of the raisins between the wires thereof, means for cutting the skins of the raisins over the protruded seeds, comprising a wheel having knives therein and means for revolving said wheel, and means for removing the seeds from the raisins, substantially as described.

In testimony whereof I have hereunto set my hand in the presence of two subscribing witnesses.

WILLIAM H. KNAPP.

Witnesses:
W. M. McDaniel,
L. W. Rayno.